(12) United States Patent
Sterling et al.

(10) Patent No.: US 7,136,852 B1
(45) Date of Patent: Nov. 14, 2006

(54) CASE-BASED REASONING SIMILARITY METRICS IMPLEMENTATION USING USER DEFINED FUNCTIONS

(75) Inventors: Warren Martin Sterling, Rancho Palos Verdes, CA (US); Barbara Jane Ericson, Decatur, GA (US)

(73) Assignee: NCR Corp., Dayton, OH (US)

( * ) Notice: Subject to any disclaimer, the term of this patent is extended or adjusted under 35 U.S.C. 154(b) by 409 days.

(21) Appl. No.: 09/994,529

(22) Filed: Nov. 27, 2001

(51) Int. Cl.
*G06F 17/30* (2006.01)

(52) U.S. Cl. .............. 707/5; 707/6; 707/10; 707/104.1; 706/48; 704/254; 704/256.8

(58) Field of Classification Search .............. 707/3, 707/6, 4, 5, 9, 10, 104.1; 706/47, 48; 704/254, 704/256; 382/207
See application file for complete search history.

(56) References Cited

U.S. PATENT DOCUMENTS

| | | | | |
|---|---|---|---|---|
| 3,930,231 A | * | 12/1975 | Henrichon et al. | 382/207 |
| 4,823,306 A | * | 4/1989 | Barbic et al. | 707/5 |
| 5,170,432 A | * | 12/1992 | Hackbarth et al. | 704/254 |
| 5,794,250 A | * | 8/1998 | Carino et al. | 707/9 |
| 5,864,843 A | * | 1/1999 | Carino et al. | 707/4 |
| 5,864,870 A | * | 1/1999 | Guck | 707/104.1 |
| 5,893,095 A | * | 4/1999 | Jain et al. | 707/6 |
| 6,067,542 A | * | 5/2000 | Carino, Jr. | 707/4 |
| 6,219,642 B1 | * | 4/2001 | Asghar et al. | 704/256.8 |
| 6,285,995 B1 | * | 9/2001 | Abdel-Mottaleb et al. | 707/3 |
| 6,636,849 B1 | * | 10/2003 | Tang et al. | 707/6 |
| 6,704,719 B1 | * | 3/2004 | Ericson | 706/48 |

OTHER PUBLICATIONS

Lenz, Mario; Brigitte Bartsch-Sport; Hans-Dieter Burkhard; Stefan Wess; G. Goos; J. Harmanis; J. Van Leeuwen; "Case Based Reasoning Technology: Foundations to Applications." Oct. 15, 1998, Springer-Verlag (TM), pp. 327-351.*

* cited by examiner

*Primary Examiner*—Shahid Alam
(74) *Attorney, Agent, or Firm*—Baker Botts, LLP; Harden E. Stevens (57) ABSTRACT

A database system and a method for case-based reasoning are disclosed. The database system includes an exemplar object within the database configured to accept and store a plurality of exemplar cases, a target object within the database configured to accept and store a target case, and a comparison object within the database for comparing the target case with the plurality of exemplar cases. The method includes comparing the target case with the plurality of exemplar cases within a database to produce similarity metrics and determining the similarity between the target and exemplar cases based on the similarity metrics.

24 Claims, 10 Drawing Sheets

CASE BASED REASONING
(PRIOR ART)

FIG. 1

(PRIOR ART)

Case Comparison Process

FIG. 13

CASE-BASED REASONING SIMILARITY METRICS IMPLEMENTATION USING USER DEFINED FUNCTIONS

BACKGROUND

Figure 1:
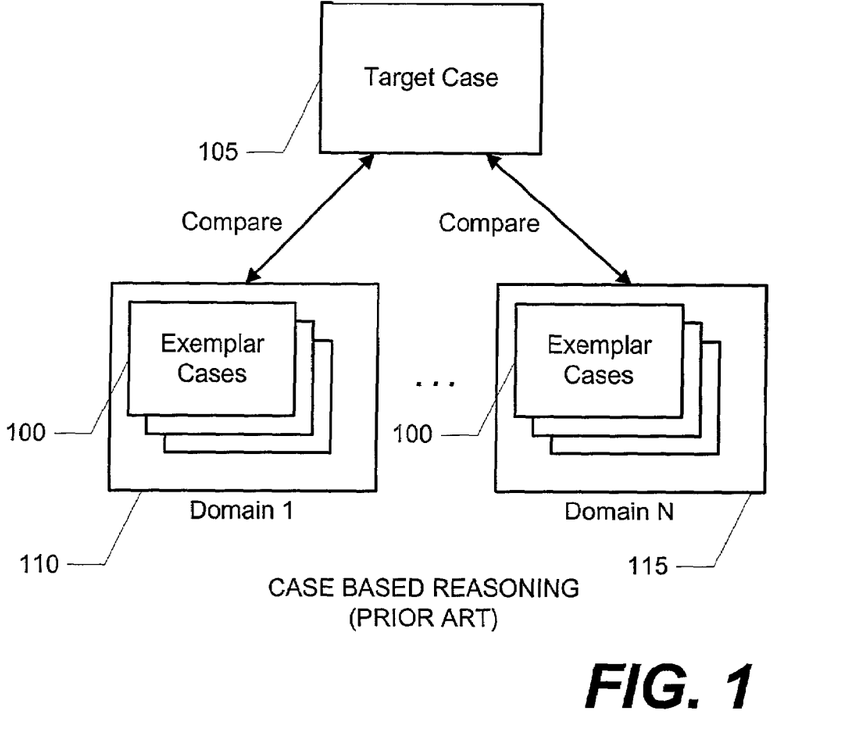
FIG. 1 is a block diagram of a prior art case-based reasoning system.

Case-based reasoning, illustrated in FIG. 1, compares features of known problems and solutions (referred to as "exemplar cases" 100 or simply "exemplars") to features of a new problem (referred to as a "target case" 105). The exemplar cases may be organized into domains, such as exemplar case domains 110 and 115. The result of the comparison between each feature of the target case and the corresponding feature of the exemplar case is a similarity metric, representing the degree of matching between the features. The advantage of case-based reasoning is that it is quicker to develop and easier to maintain than other forms of artificial intelligence.

Databases are useful for case-based reasoning because they can store large amounts of data and retrieve it quickly. This is particularly useful for storing vast numbers of exemplars. In an existing case-based reasoning system using a database, illustrated in FIG. 2, data (e.g., a target case and a set of exemplar cases) is extracted from a database 200 and provided to an external program 205. The external program 205 compares the target case to each exemplar case and returns a similarity metric for each comparison to the database system. The database system then selects exemplar cases that best match the target case-based on the similarity metrics. Note that the target case could be retrieved from some source other than the database.

SUMMARY

In general, in one aspect, the invention features a database system. The database system includes an exemplar object within the database configured to accept and store a plurality of exemplar cases, a target object within the database configured to accept and store a target case, and a comparison object within the database for comparing the target case with the plurality of exemplar cases.

Implementations of the invention may include one or more of the following. The exemplar object may include an attribute of a schema and the comparison object may include a method of the schema. The exemplar object may include a user defined type which may be implemented using an object relational database. The target object may include an attribute of a schema. The target object schema may include a user defined type which may be implemented using an object relational database. The exemplar object may include a database table and the target object may include a database table. The comparison object may include a macro.

The database system may further include a means of grouping exemplar cases into domains, where the exemplar case may be a member of more than one domain.

The database system may further include a user interface allowing the pruning of domains to exclude from comparison with the target case.

The target case may include a target feature and the exemplar case may include an exemplar feature. A user interface may allow population of the target features. A user interface may allow population of the exemplar feature.

The comparison object may include a user defined function. The user defined function may calculate a similarity metric representing the similarity between the target feature and the exemplar feature. The user defined function may perform mathematical operations to determine the similarity metric. The user defined function, in calculating the similarity metric, may determine the relationships between nodes representing the target feature and the exemplar feature in a hierarchical structure. The target case may include a plurality of target features and each exemplar case may include a corresponding plurality of exemplar features. The user defined function may compare the target case with each of the exemplar cases, and determine an overall match factor for each comparison. The user defined function may determine the overall match factor by computing similarity metrics. The user defined function may compute similarity metrics by comparing each target feature in the target case with the corresponding exemplar feature in an exemplar case and summing the similarity metrics.

The user defined function may determine the similarity metrics by comparing each target feature in the target case with the corresponding exemplar feature in the exemplar case. The user defined function may create a weighted similarity metric by multiplying the similarity metrics by a weight associated with that similarity metric. The user defined function may determine the overall match factor by summing the weighted similarity metrics.

The user defined function may indirectly recognize the similarity between the target and exemplar case. The user defined function may be aware of features which are indicative of a finding and the user defined function may recognize that the target case possesses the feature indicative of the finding exemplified by the exemplar case, even when the exemplar case lacks that feature. The user defined function may be aware of features, the lack of which are indicative of a finding and the user defined function may recognize that the target case lacks a feature, the lack of which is indicative of the finding exemplified by the exemplar case, even when the exemplar case possesses that feature.

In general, in another aspect, the invention features a method for implementing a case-based reasoning system including comparing a target case with a plurality of exemplar cases within a database to produce similarity metrics and determining the similarity between the target and exemplar cases based on the similarity metrics.

Implementations of the invention may include one or more of the following. Comparing may include not spawning a process external to the database. Comparing may include not running an external program. Comparing may include using a user defined function of the database. Comparing may include determining which of the exemplar cases best matches the target case.

In general, in another aspect, the invention features a method for implementing a database function, including accepting a target case for comparison and comparing, within the database, the target case with a plurality of the exemplar cases stored in the database.

In general, in another aspect, the invention features a method for implementing a case-based reasoning system including accepting information representing a target case, accepting weights to apply to a set of respective similarity metrics, accepting the number of closest matching exemplar cases the user wants to review, formulating and executing, within the database, a comparison between the target case and the exemplar cases yielding the similarity metrics for that exemplar case, deriving an overall match factor for each of the exemplar cases from the similarity metrics, weighed by their weights and reporting one or more of the closest matching exemplar cases.

In general, in another aspect, the invention features a database system for accessing a database. The database system includes a massively parallel processing system including one or more nodes, a plurality of CPUs, each of the one or more nodes providing access to one or more CPUs, a plurality of virtual processes each of the one or more CPUs providing access to one or more processes, each process configured to manage data stored in one of a plurality of data-storage facilities. The database system includes a case-based reasoning system. The case-based reasoning system includes an exemplar object within the database configured to accept and store a plurality of exemplar cases such that they are distributed evenly among the data storage facilities. The case-based reasoning system also includes a target object within the database configured to accept and store a target case. The case-based reasoning system also includes a comparison object within the database for comparing the target case with the plurality of exemplar cases.

Other features and advantages will become apparent from the description and claims that follow.

DETAILED DESCRIPTION

Figure 3:
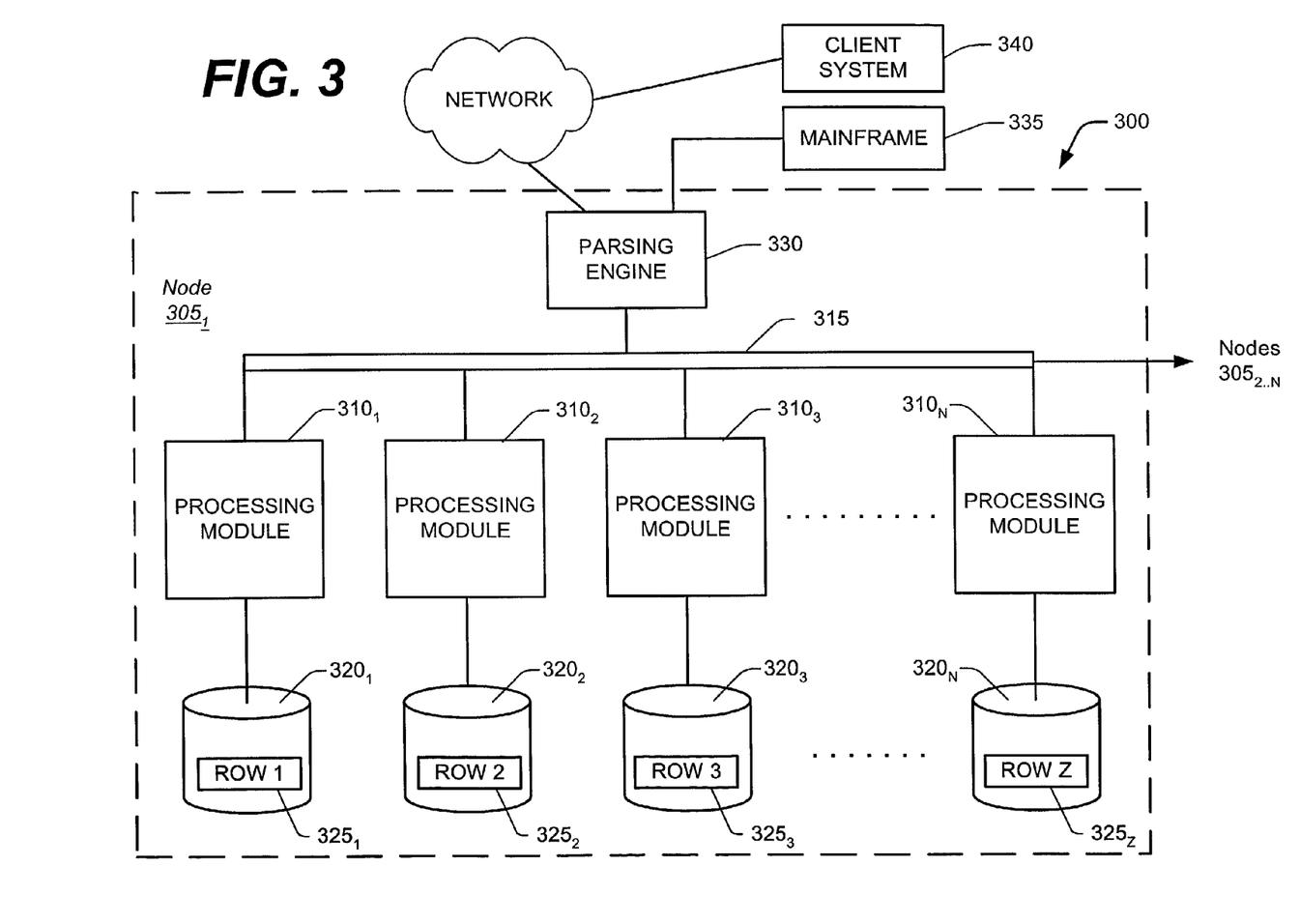
FIG. 3 is a block diagram of a node of a database system.

The case-based reasoning system disclosed herein has particular application to large databases that might contain many millions or billions of records managed by a database system 300, such as a Teradata Active Data Warehousing System available from NCR Corporation. FIG. 3 shows a sample architecture for one node $305_1$ of the database system 300. The database system node $305_1$ includes one or more processing modules $310_{1 \ldots N}$, connected by a network 315 that manage the storage and retrieval of data in data-storage facilities $320_{1 \ldots N}$. Each of the processing modules $310_{1 \ldots N}$ may be one or more physical processors or each may be a virtual processor, with one or more virtual processors running on one or more physical processors. Persons of ordinary skill will recognize that the "N" used in FIG. 3 is not the same as the "N" used in FIG. 4 or in other Figures described herein. The use of "N", "M", "Z" or the like in describing any Figure herein is intended to convey the idea of an arbitrary constant number.

For the case in which one or more virtual processors are running on a single physical processor, the single physical processor swaps between the set of N virtual processors.

For the case in which N virtual processors are running on an M-processor node, the node's operating system schedules the N virtual processors to run on its set of M physical processors. If there are 4 virtual processors and 4 physical processors, then typically each virtual processor would run on its own physical processor. If there are 8 virtual processors and 4 physical processors, the operating system would schedule the 8 virtual processors against the 4 physical processors, in which case swapping of the virtual processors would occur.

Each of the processing modules $310_{1 \ldots N}$ manages a portion of a database that is stored in a corresponding one of the data-storage facilities $320_1 \ldots N$. Each of the data-storage facilities $320_{1 \ldots N}$ includes one or more disk drives. The database system may include multiple nodes $305_{2 \ldots N}$ in addition to the illustrated node $305_1$, connected by extending the network 315.

The system stores data in one or more tables in the data-storage facilities $320_{1 \ldots N}$. The rows $325_{1 \ldots Z}$ of the tables are stored across multiple data-storage facilities $320_{1 \ldots N}$ to ensure that the system workload is distributed evenly across the processing modules $310_{1 \ldots N}$. A parsing engine 330 organizes the storage of data and the distribution of table rows $325_{1 \ldots Z}$ among the processing modules $310_{1 \ldots N}$. The parsing engine 330 also coordinates the retrieval of data from the data-storage facilities $320_{1 \ldots N}$ in response to queries received from a user at a mainframe 335 or a client computer 340. The database system 300 usually receives queries in a standard format, such as SQL.

Figure 4:
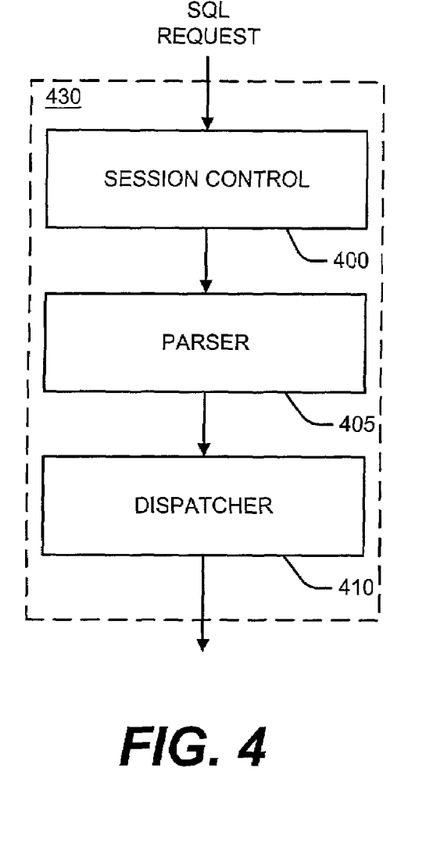
FIG. 4 is a block diagram of a parsing engine.

In one example system, the parsing engine 330 is made up of three components: a session control 400, a parser 405, and a dispatcher 410, as shown in FIG. 4. The session control 400 provides the logon and logoff function. It accepts a request for authorization to access the database, verifies it, and then either allows or disallows the access.

Figure 5:
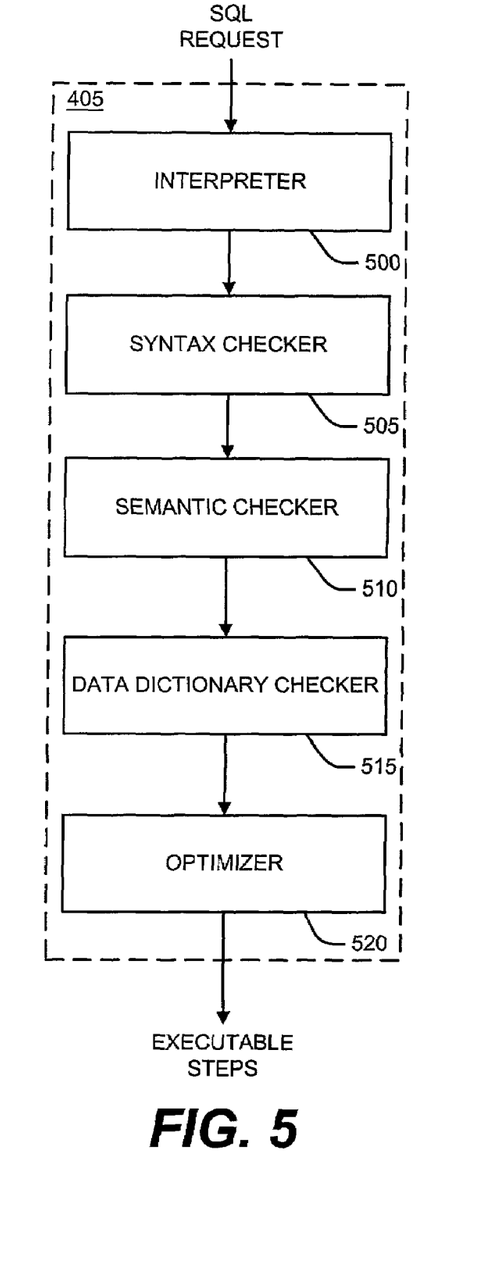
FIG. 5 is a flow chart of a parser.

Once the session control 400 allows a session to begin, a user may submit a SQL request that is routed to the parser 405. As illustrated in FIG. 5, the parser 405 interprets the SQL request (block 500), checks it for proper SQL syntax (block 505), evaluates it semantically (block 510), and consults a data dictionary to ensure that all of the objects specified in the SQL request actually exist and that the user has the authority to perform the request (block 515). Finally, the parser 405 runs an optimizer (block 520) that develops the least expensive plan to perform the request.

Figure 6:
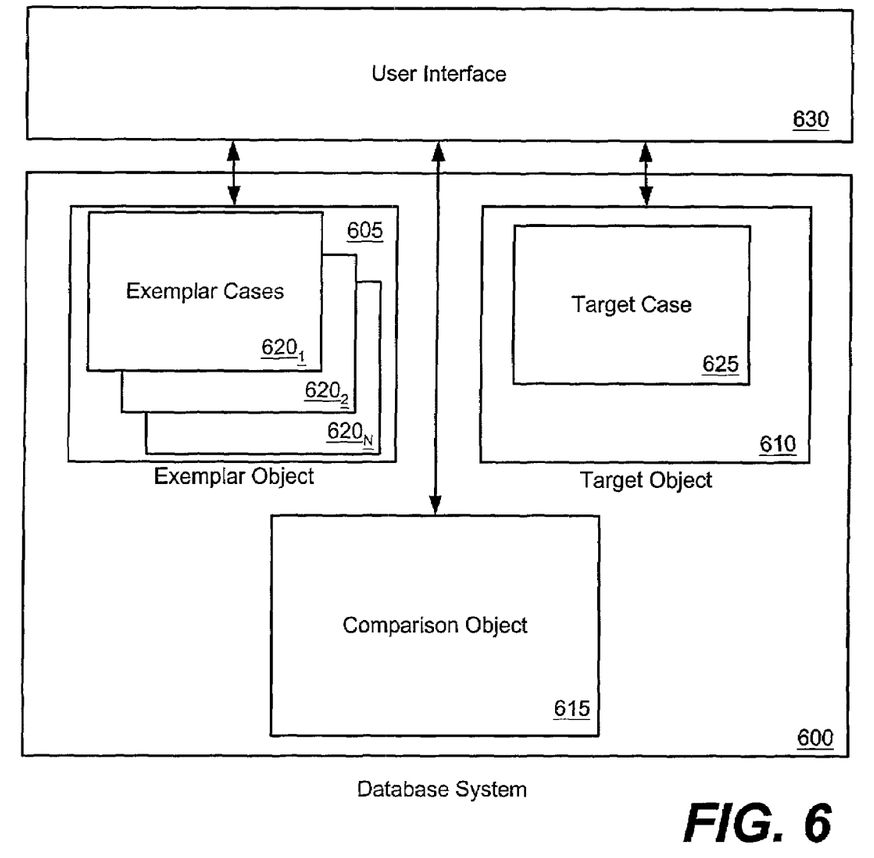
FIG. 6 is a block diagram of a database system and user interface.

In one example of a CBR system, illustrated in FIG. 6, a database system 600 consists of an exemplar object 605, a target object 610, and a comparison object 615. The exemplar object 605 contains exemplar cases $620_{1 \ldots N}$ and the target object 610 contains a target case 625. The comparison object 615 compares the exemplar cases $620_{1 \ldots N}$ with the target case 625 and determines the exemplar case or cases (e.g., $620_1$) that best match the target case 625.

In one example, the exemplar object 605 and the target object 610 may be database tables. The comparison object 615 may be a set of commands executed in database, possibly as a macro. In another example, using SQL-99 or similar database languages, the exemplar object 605 and the target object 610 may be attributes of a User Defined Type (UDT). A UDT is a type of schema, or data grouping. In database programming, a schema is analogous to an object in other programming languages because the schema contains data (properties of the object) and functions that operate on the data (functionality of the object) in a single unit. The comparison object 615 may be one or more methods of the UDT associated with the target object 610 or one or more methods of the UDT associated with the exemplar object 605, or one or more methods of a separate UDT.

A user interface 630 may be a visual or textual front end to the database system 610 communicating through an application programming interface (API) to the database system 610. One example of an API is Open Database Connectivity (ODBC). The user interface 630 may perform the following tasks:

accept the target case 625 for processing by the CBR system;
   accept the exemplar cases $620_{1\ldots N}$ for loading in the database;
   accept weights to be assigned to each feature similarity metric for the overall match calculation (discussed later) and modify the overall match factor user defined function (discussed later) accordingly;
   examine the target case to perform preliminary pruning of the search space; this involves removing domains of exemplar cases $620_{1\ldots N}$ that are not relevant to the target case 625. It may also involve reducing the set of exemplar cases in a domain that are compared to the target case.
   initiate queries against the database system 600 comparing the target case 625 with the exemplar cases $620_{1\ldots N}$;
   retrieve the exemplar case or cases (e.g., $620_1$) most closely matching the target case 625;
   present the closest matching exemplar cases to the user.

Figure 7:
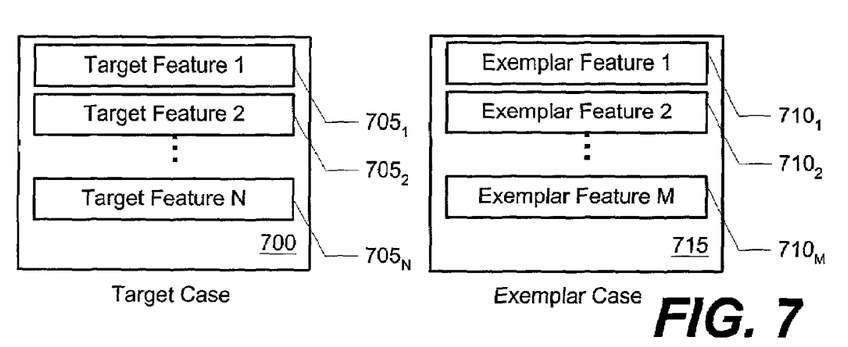
FIG. 7 shows the features associated with a target case and an exemplar case.

Target cases are partitioned into features in order to compare them with exemplar cases, as shown in FIG. 7. The target case 700 is partitioned into target features $705_{1\ldots N}$ that correspond with exemplar features $710_{1\ldots M}$ associated with the exemplar case 705. The target case 700 and the exemplar case 705 may have one or more features with null values. This will not affect the functionality of the CBR system. Generally, each target feature (e.g., $705_1$) can be compared meaningfully to a corresponding exemplar feature (e.g., $710_1$). Examples of features for medical cases are: problem duration, findings, signs and symptoms, age, sex, vital signs, occupation, and family history.

The key to a successful CBR system is to have a set of exemplar cases $620_{1\ldots N}$ that adequately cover the domain in which the target case 625 lies. Examples of domains are: product software problems reported to a help desk, medical cases involving brain attack, and machine malfunctions. In some areas, such as medicine, there can be a very large number of domains with many cases covering each domain. Also, the target case 625 may have to be compared against a number of domains as part of the classification process. While many of the examples described herein are directed to the field of medicine, these techniques can be used in any field, especially where case-based reasoning is used.

Figure 8:
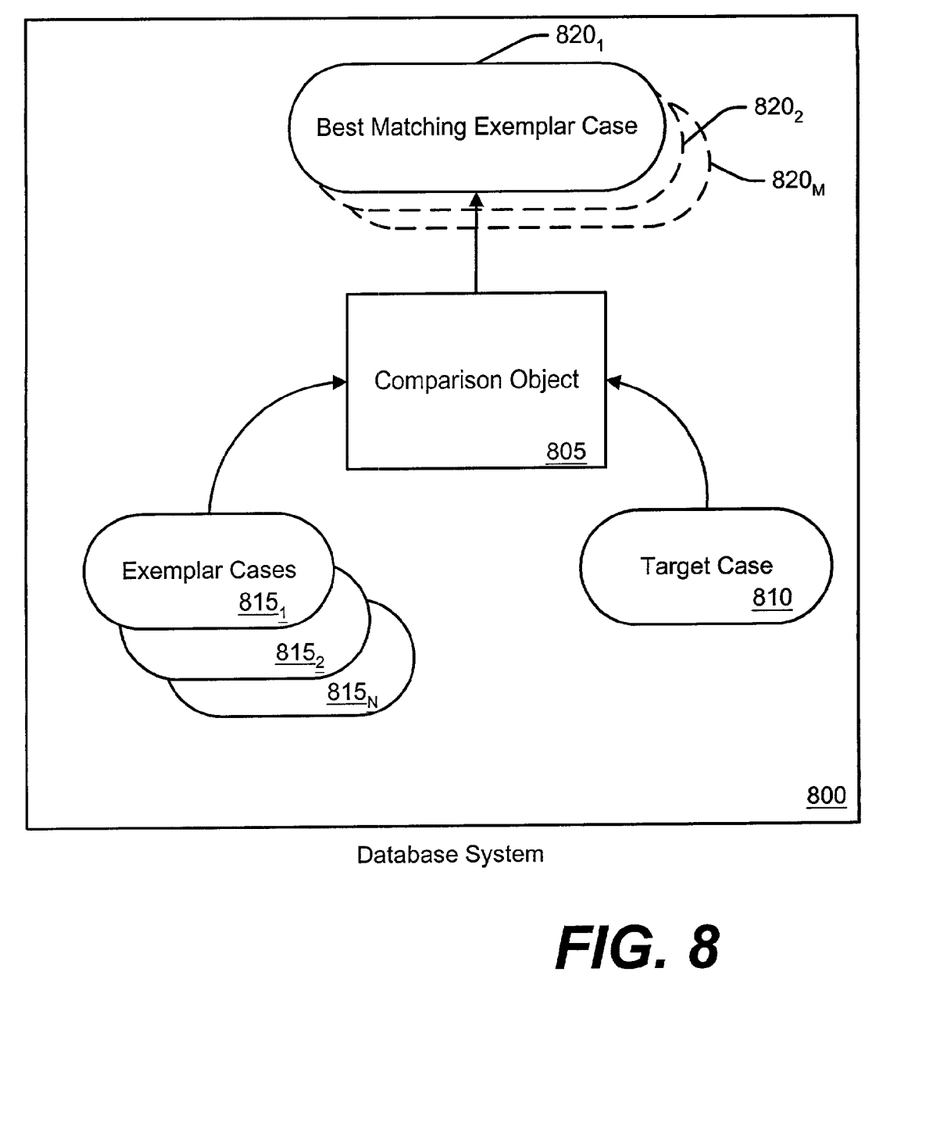
FIG. 8 is a block diagram of a database system.

In operation, as illustrated in FIG. 8, the comparison object 805 compares the target case 810 (contained in the target object 610) to each of the exemplar cases $815_{1\ldots N}$ (contained in the exemplar object 605) to determine the best matching exemplar case or cases $820_{1\ldots M}$. Based on a selection made through the user interface 630, the comparison object 805 may return more than one best matching exemplar case $820_{1\ldots M}$ (the additional best matching cases are shown in FIG. 8 with dashed lines). For example, the user may want to know the top M matching exemplar cases.

Figure 9:
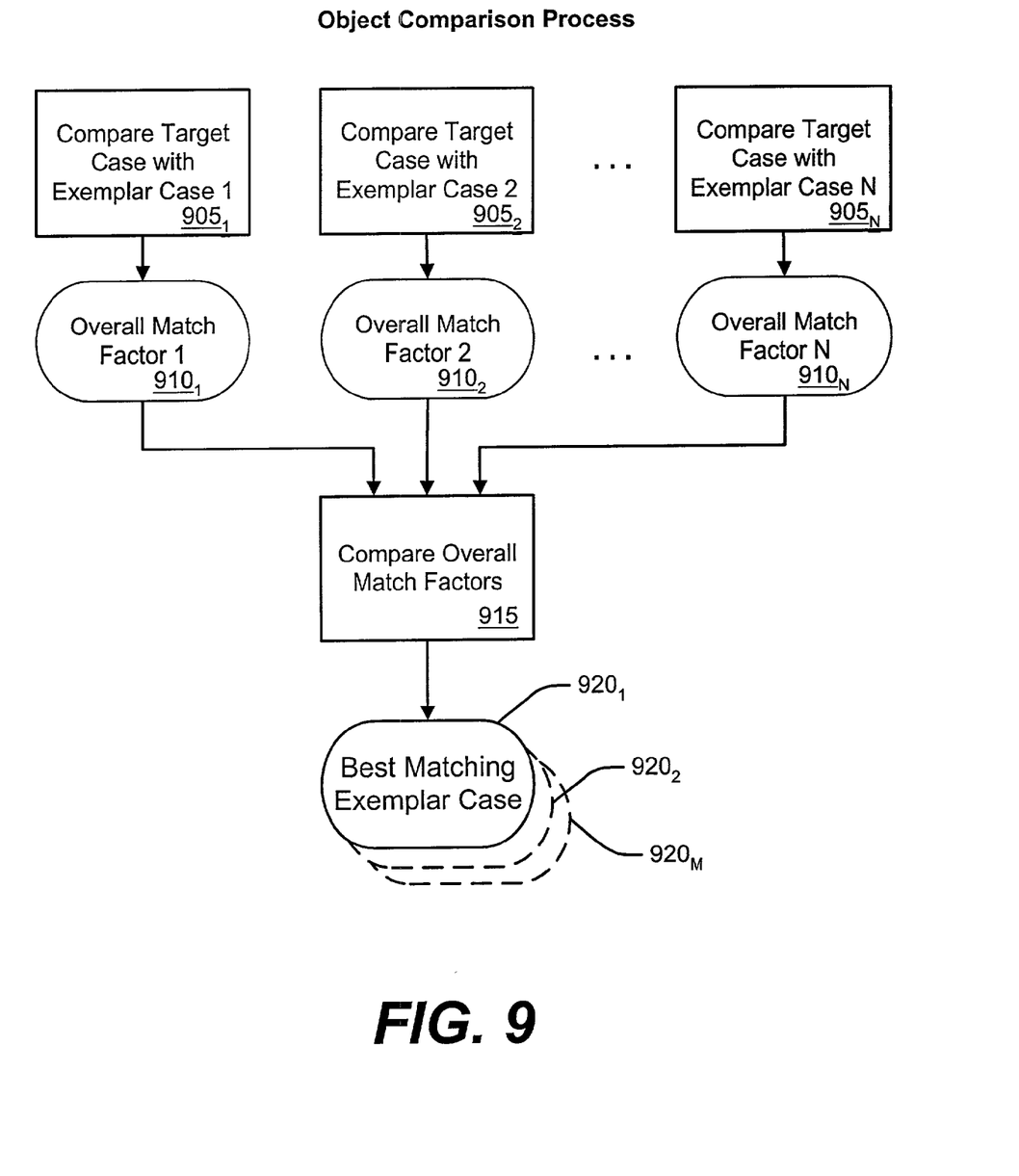
FIG. 9 is a block diagram of an object comparison process.

The processing of the comparison object 805, illustrated in FIG. 9, compares the target case 810 with each of the exemplar cases $815_{1\ldots N}$ (blocks $905_{1\ldots N}$) to produce an overall match factor (e.g., $910_1$) for each comparison. The comparison object 805 compares the overall match factors $910_{1\ldots N}$ to find the best matching exemplar case or cases $920_{1\ldots M}$ (block 915).

Figure 10:
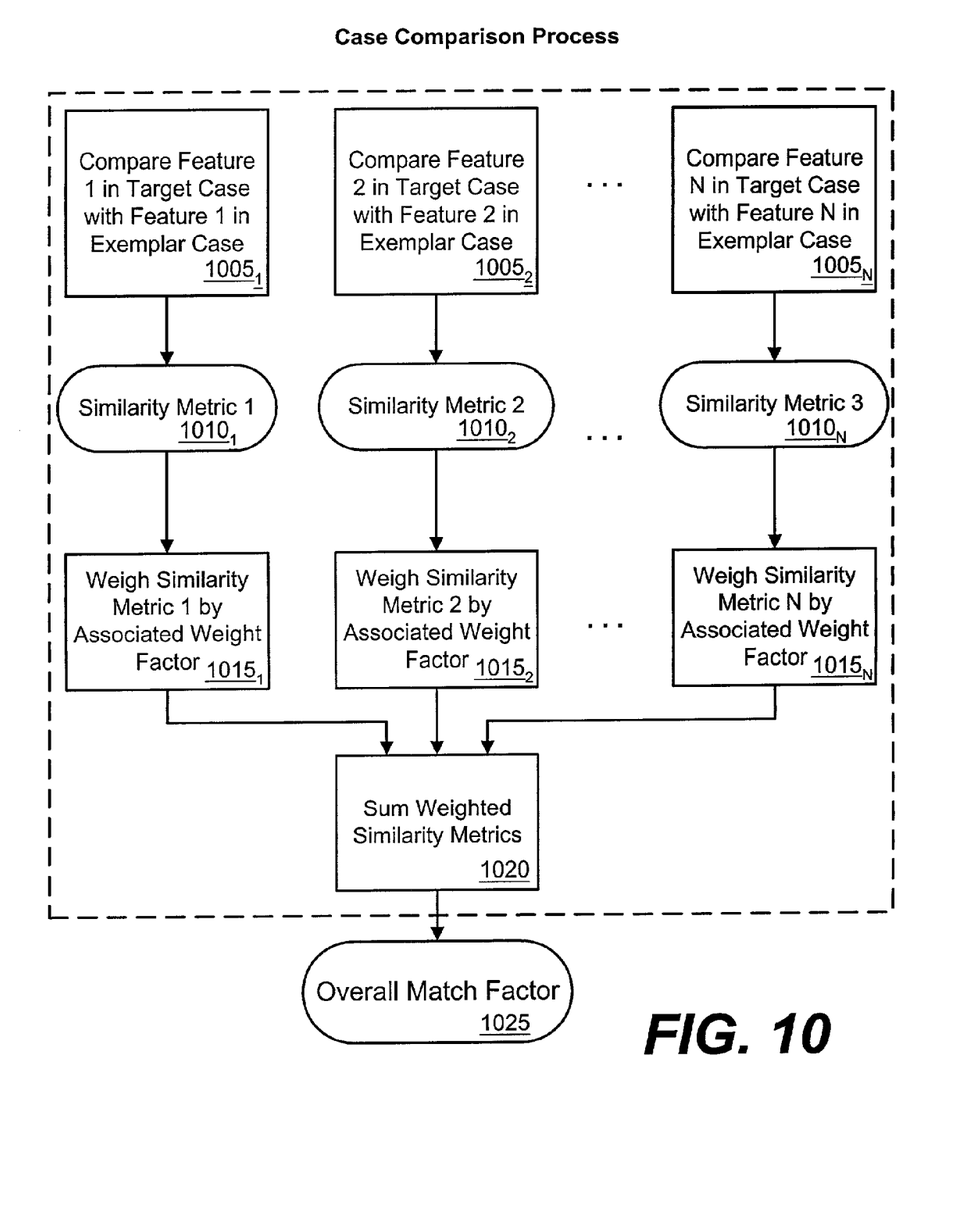
FIG. 10 is a block diagram of a case comparison process.

The processing associated with comparing each exemplar case to the target case, illustrated in FIG. 10, includes comparing the target features $705_{1\ldots N}$ to corresponding exemplar features $710_{1\ldots M}$ (blocks $1005_{1\ldots N}$) with each comparison producing similarity metrics $1010_{1\ldots N}$. The similarity metrics $1010_{1\ldots N}$ are weighted by corresponding weight factors (blocks $1015_{1\ldots N}$), which may be provided through the user interface 630. The weighted similarity metrics are then summed to produce the overall match factor 1025 (block 1020).

Figure 11:
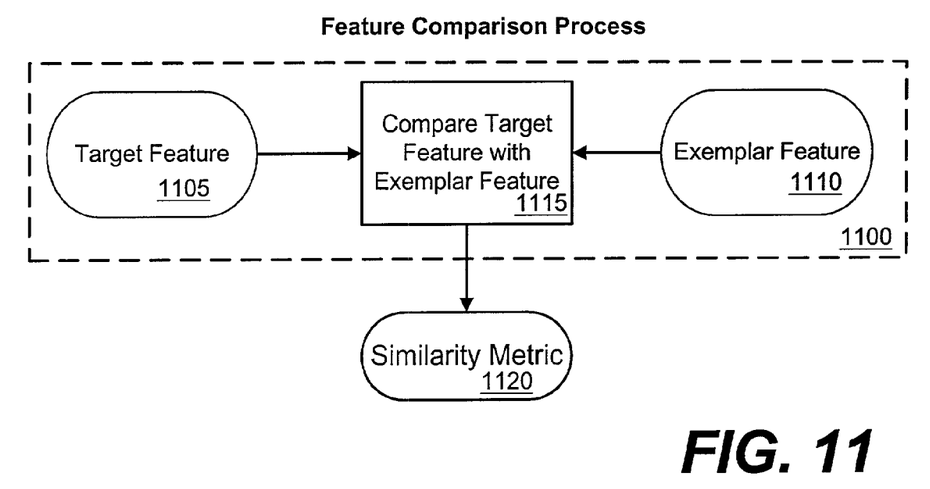
FIG. 11 is a block diagram of a feature comparison process.

In an example of the comparison of target features and corresponding exemplar features illustrated in FIG. 11, a target feature 1105 is compared (block 1115) to an exemplar feature 1110 to produce a similarity metric 1120. The similarity metric 1120 is a numerical measure of the similarity between the target feature 1105 and the exemplar feature 1110.

In one example system, the processing illustrated in FIGS. 8–11 is accomplished in the context of an object relational (O/R) database. O/R databases have the following properties that are helpful in performing the feature comparison process:

the ability to store extended data types beyond those typically used in relational databases. Examples of traditional data types are integers, character strings, floating point numbers, and dates. Examples of extended data types in O/R databases are digital images, video clips, complex documents, time series, and geo-spatial elements.
   the ability to store very large data types. Examples of these data types include: a set of digitized MRI scans requiring multiple Megabytes of storage or a lengthy video requiring over a Gigabyte of storage.
   the ability to allow a user to define functions that operate on elements stored in the O/R database. These are called User Defined Functions (UDFs). These functions can return values based on the results of the operation or they can modify the element, creating a new or updated element. For example, a user could write an image processing algorithm to analyze a digitized MRI scan image and detect the presence and extent of a tumor in the image. This UDF would return a value pair indicating the probability that a tumor exists and, in cases of high probability of existence, the size of the tumor. Unlike traditional database driven CBR systems, the UDF is evaluated inside the database.
   the ability of a UDF to perform "callouts" to data structures outside of the O/R database to access required information. For example, a UDF could access a database containing information on the Unified Medical Language System in order to determine synonyms for the word "stroke".

If the database uses a massively parallel processing (MPP) architecture, the CBR system can apply UDFs to database elements in parallel. Unlike traditional implementations of CBR systems, the parallelism of a database using a MPP architecture allows multiple instances of the UDFs to execute concurrently, speeding execution.

Figure 2:
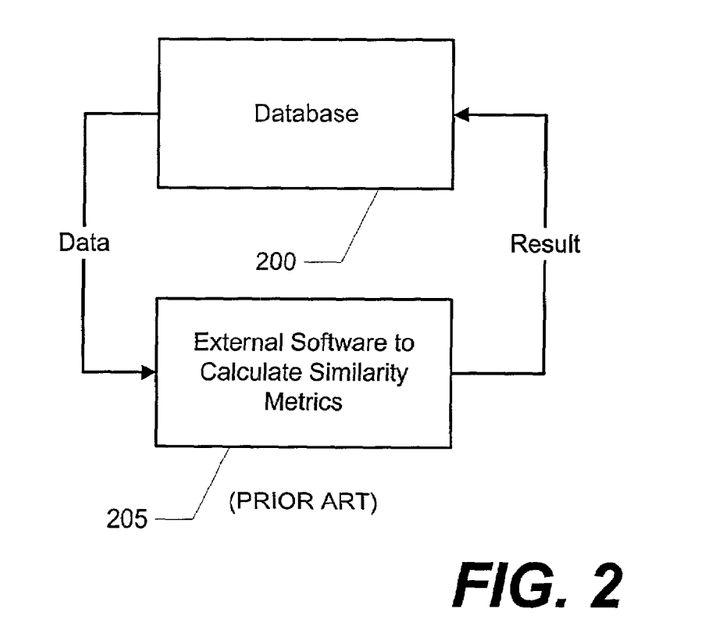
FIG. 2 is a block diagram of a database and prior art external software.

The comparison 1115 may be evaluated using only standard SQL supported comparison and mathematical operations. However, more advanced comparisons may be implemented using UDFs. With UDFs, the comparison between the target case and the exemplar cases can be preformed entirely within the database system, as shown in FIG. 6. Consequently, the external software 205, illustrated in FIG. 2, is not necessary in a database system using UDFs.

In one example, a UDF returns a similarity metric value of "1"—if the target feature 1105 and the exemplar feature 1110 are identical. The UDF below, which is from the medical domain, returns a similarity metric of "1" if the symptoms are identical in the two cases:

ExactMatch(targetSymptom) integer
  (If targetsymptom=Substring(Exemplars.Symptoms)
    or if Exemplars.Symptoms=null
   then ExactMatch=1
   else ExactMatch=0
  )

In another example, the similarity metric 1120 is assigned a value of "1" if both the target feature 1105 and the exemplar feature 1110 are within a specified range. If the target feature 1105 or the exemplar feature 1110 fall outside the specified range, the similarity metric 1120 is assigned a value of "0". For example, assume the target feature 1105 has a value of "5," exemplar feature 1110 has a value of "3," and the desired range is from "1" to "8." In this case, the similarity metric 1120 will be assigned a value of "1" because both the target feature 1105 and the exemplar feature 1110 are within the specified range. The UDF for implementing this range match could be written as follows:

RangeMatch(targetAge, LowerAge, UpperAge) integer
  (targetAge between LowerAge and UpperAge
    and Examplars.Age between LowerAge and UpperAge
   then RangeMatch=1
   else RangeMatch=0
  )

The user defined comparison functions are not limited to simple matching or mathematical operations. They can perform complex operations on the data, such as image processing. This is illustrated by the pseudocode below, where the target feature 1105 is a MRI scan. The UDF assigns a value of "1" to the similarity metric 1120 if the scan shows the presence of a tumor, otherwise the UDF assigns a value of "0" to the similarity metric. The UDF for implementing this imaging match could be written as follows:

TumorPresence (void) integer
  (code that analyzes Exemplars.MRI_Scan for the presence of
    a tumor and returns the following:
    TumorPresence=1 if tumor present
    TumorPresence=0 if tumor not present
  )

In another example UDF, the similarity metric 1120 would be related to the ratio of the target feature 1105 to the exemplar feature 1100. For example, if the target feature 1105 and the exemplar feature 1110 were equal, then the similarity metric 1120 would be "1". If they were not equal, the similarity metric 1120 would have some value less than "1." The UDF for implementing this ratio match could be written as follows:

RatioMatch (targetSize) real
  (if targetSize>exemplarSize
    then RatioMatch=exemplarSize/targetSize
    else RatioMatch=targetSize/exemplarSize
  )

In another example UDF, the similarity metric 1120 would be the inverse distance between nodes which correspond to the target feature 1105 and the exemplar feature 1110 in a hierarchical structure. In a more specific example, this hierarchical structure would be a simple binary tree where the target feature 1105 and the exemplar feature 1110 correspond to nodes in the tree. An algorithm would be employed within a UDF to walk between the two nodes, thereby finding the distance between them. This is only one example of a hierarchical structures that the could be analyzed using a UDF. Further, other UDFs might calculate other measures of the relationships of elements in a given hierarchical structure. For example, another UDF could calculate the distance between two elements on only one axis.

In another example UDF, the similarity metric 1120 would be equal to "1" if the target value 1105 is a member of a set of values. Otherwise, the similarity metric 1120 would be equal to "0".

In some domains, target features $705_{1 \ldots N}$ must be compared not only to the actual exemplar values $705_{1 \ldots N}$ but to "possible values" associated with the problem identified in the exemplar case (e.g., $620_1$). Matching beyond the actual feature values of the target case 625 and exemplar cases $620_{1 \ldots N}$ is known as "indirect matching." This is illustrated in the following medical case analysis. The patient represented in the target case 625 smokes. The patient represented by the exemplar case (e.g., $620_1$) does not. Normally, in an exact match of social history this would result in a similarity of 0.0 (assuming no other social history items). However, in the exemplar case (e.g., $620_1$), the finding is subarachnoid hemorrhage. Smoking is a risk factor for subarachnoid hemorrhage. Therefore, applying the concept of indirect match would result in a similarity of 1.0 for this feature.

Another important element of feature matching is the application of an ontology such as the Unified Medical Language System. An ontology finds matches in the following situations:

the target feature (e.g., $705_1$) and exemplar feature (e.g., $710_1$) are synonyms; (e.g., stroke=cva=brain attack)

the target feature (e.g., $705_1$) and exemplar feature (e.g., $710_1$) are lexical variants; (e.g., angiogram=angiography)

the target feature (e.g., $705_1$) and exemplar feature (e.g., $710_1$) are semantically related, (E.g., A Cerebral Hemorrhage is a kind of stroke.)

In some example systems, the database has the ability to access external data sources in order to determine these equivalencies. The database may then adjust its calculations of similarity metrics accordingly.

Figure 12:
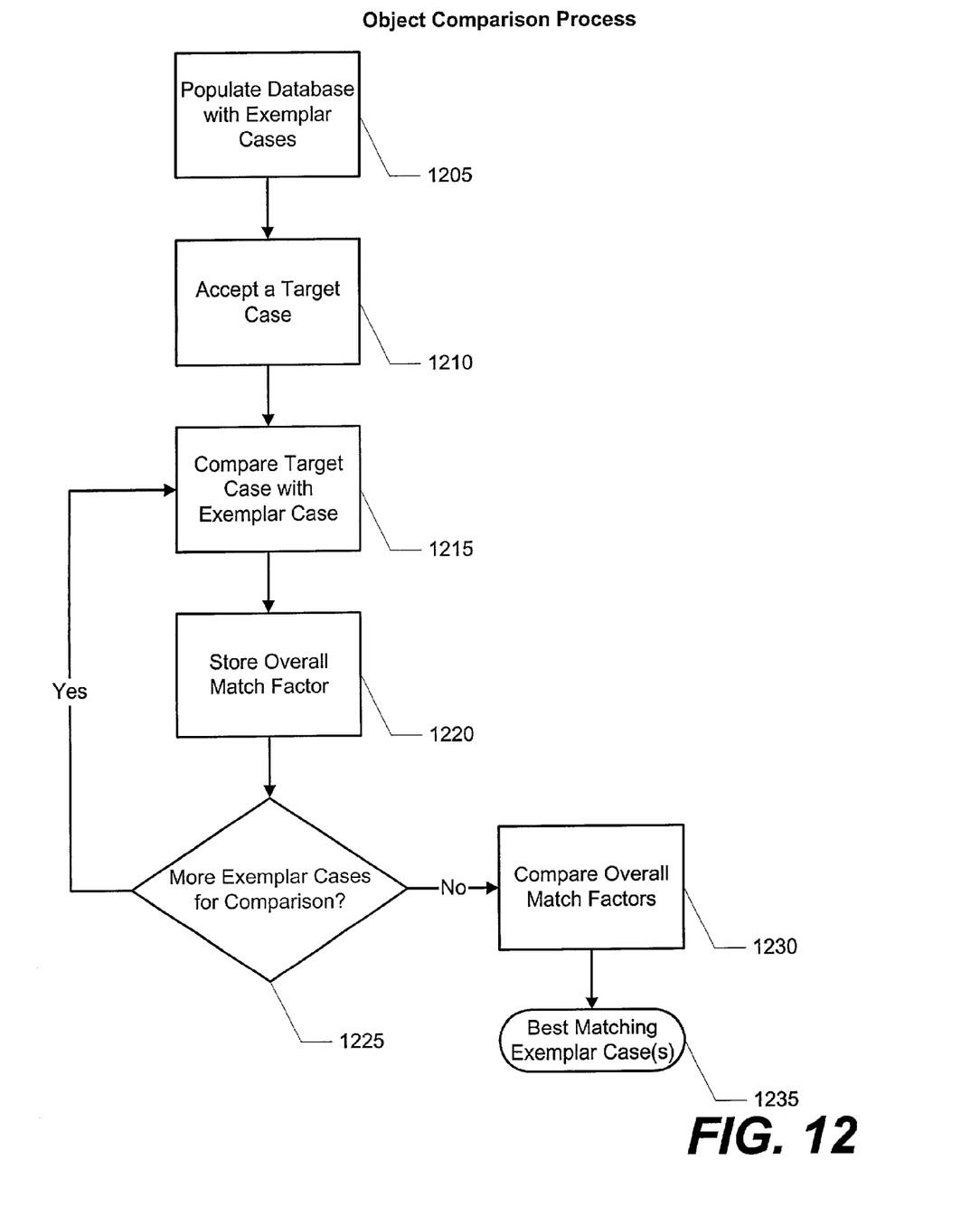
FIG. 12 is a flow chart of an object comparison process.

The operation of the CBR system, illustrated in FIG. 12, begins by populating the database system 600 with exemplar cases $620_{1 \ldots N}$ (block 1205). The database system 600 accepts a target case 625 (block 1210) and enters a loop in which it compares the target case with each exemplar case. In the loop, the database system 600 compares the target case 625 with the first exemplar case $620_1$ (block 1215). The result of the case comparison (block 1215) is the overall match factor 1025 for the exemplar case (e.g., $620_1$) currently being compared with the target case 625. The overall match factor (e.g., $910_1$) is stored, possibly in a temporary table in the database system 600 (block 1220). The database system 600 then determines if there are more exemplar cases $620_{1 \ldots N}$ to compare with the target case 625 (block 1225). If there are more, the next exemplar case (e.g., $620_2$) is compared with the target case 625 (block 1215), and the resulting overall match factor (e.g., $910_1$) is stored (block 1220). The cycle repeats until all the exemplar cases $620_{1 \ldots N}$ are exhausted. Finally, the database system 600 compares all of the stored overall match factors $910_{1...N}$ to determine the exemplar case or cases 1235 that best match the target case (block 1230).

Figure 13:
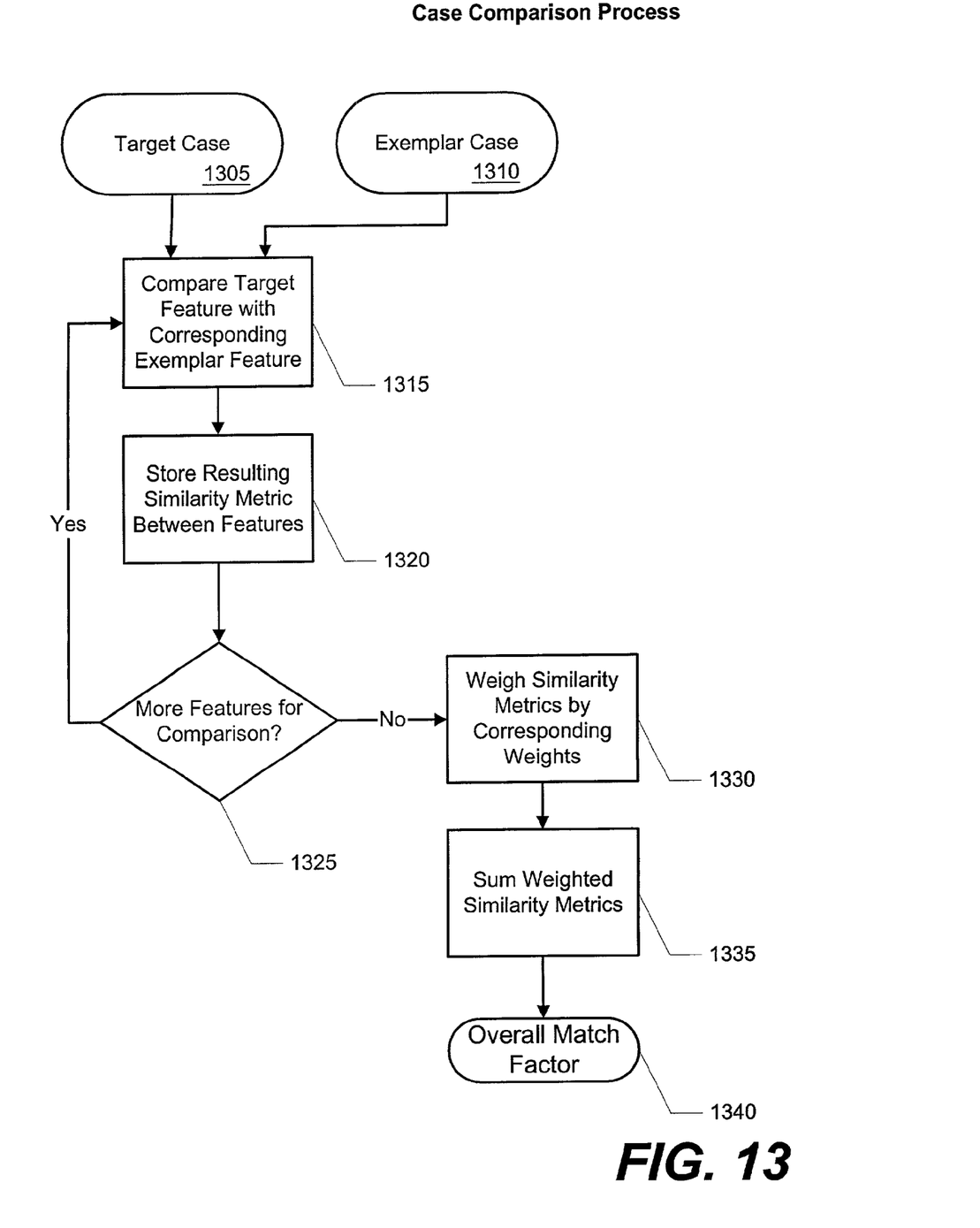
FIG. 13 is a flow chart of a case comparison process.

The comparison of a target case 1305 and an exemplar case 1310 (block 1215), illustrated in FIG. 13, begins by comparing the first feature of the target case 1305 and the corresponding feature of the exemplar case 1310 (block 1315). The resulting similarity metric 1120 is stored, possibly in a temporary database table (block 1320). The database system 600 then determines if the target case 1305 and exemplar case 1310 have more features to compare (block 1325). If so, the database system 600 compares the next set of corresponding features from the target case 1305 and the exemplar case 1310 (block 1315). The database system continues to compare features (block 1315) and store similarity metrics $1010_{1...N}$ (block 1320) until all the corresponding pairs of features from the target case 1305 and the exemplar case 1310 have been compared.

Once there are no more features to compare the database system 600 weights the similarity metrics $1010_{1...N}$ by their corresponding weights, which may have been provided through the user interface 630 (block 1330). The weighted similarity metrics are summed (block 1335) producing an overall match factor 1340.

An example of an implementation of a CBR system follows:

Assuming the existence of the user defined functions for calculating similarity metrics created above and the following database tables:

| Table Exemplars | (CaseID | integer, |
| --- | --- | --- |
| | Symptoms | char, |
| | Diagnosis | char(100), |
| | Age | integer, |
| | MRI_Scan | DICOM3 |
| | ) | |

| Table SimilarityMetrics | (CaseID | integer, |
| --- | --- | --- |
| | SymptomMatch | integer, |
| | AgeMatch | integer, |
| | TumorMatch | integer |
| | ) | |

To calculate the overall similarity match between a target case and each of the exemplar cases, execute the following two queries:

INSERT INTO SimilarityMetrics
  VALUES (CaseID,
    ExactMatch("Dizziness"),
    RangeMatch(50,40,60),
    NOT(TumorPresence XOR 1)
  );

SELECT (CaseID, 100*(SymptomMatch+AgeMatch+TumorMatch)/3) AS percentMatch from SimilarityMetrics ORDER By percentMatch;

The INSERT query executes the similarity calculations for the target case against each of the stored exemplar cases and stores the results in the SimilarityMetrics table. In the example shown, the target case has a symptom of "dizziness", an age of 50, and shows the presence of a tumor (represented by the value "1" in the XOR expression). For the RangeMatch UDF, a range of "40" to "60" is specified. If there were no tumor present in the target case then the final expression in the INSERT parameter list would be NOT (TumorPresence XOR 0).

The SELECT query calculates an overall similarity match as a percentage (0–100%) for each exemplar case by averaging the individual similarity measures stored in the SymptomMatchtable to produce percentMatch. The results are ordered by percentMatch.

As is readily apparent, the code just described could be modified to include weight factors. In that case, the database might include a table of weight factors and the SELECT statement would include the necessary elements to retrieve the weight factors and to apply them to the similarity metrics. Other modification to this code would be apparent without further elaboration.

The text above described one or more specific embodiments of a broader invention. The invention also is carried out in a variety of alternative embodiments and thus is not limited to those described here. For example, while the invention has been described here in terms of a DBMS that uses a massively parallel processing (MPP) architecture, other types of database systems, including those that use a symmetric multiprocessing (SMP) architecture, are also useful in carrying out the invention. Many other embodiments are also within the scope of the following claims.

We claim:

1. A computer-implemented database system, including:
    an exemplar object within the database configured to accept and store a plurality of exemplar cases each including one or more exemplar features, where the exemplar cases each comprise a known problem and a corresponding solution;
    a target object within the database configured to accept and store a target case including one or more target features, where the target case comprises an actual problem; and
    a comparison object within the database configured to use a user defined function for comparing the target features of the target case with the exemplar features of each of the plurality of exemplar cases producing similarity metrics and based on the similarity metrics, generating an overall match factor for each of the plurality of exemplar cases.

2. The database system of claim 1 where the exemplar object includes an attribute of a schema; and
    the comparison object includes a method of the schema.

3. The database system of claim 2 where the schema includes a user defined type.

4. The database system of claim 3 where the user defined type is implemented using an object relational database.

5. The database system of claim 1 where the target object includes an attribute of a schema.

6. The database system of claim 5 where the schema includes a user defined type.

7. The database system of claim 6 where the user defined type is implemented using an object relational database.

8. The database system of claim 1 where the exemplar object includes a database table; and
    the target object includes a database table.

9. The database system of claim 1 where the comparison object includes a macro.

10. The database system of claim 1 further including a means of grouping exemplar cases into domains, where the exemplar case may be a member of more than one domain.

11. The database system of claim 10 further including a user interface allowing the pruning of domains to exclude from comparison with the target case.

12. The database system of claim 1 further including a user interface allowing population of the target features.

13. The database system of claim 1 further including a user interface allowing population of the exemplar features.

14. The database system of claim 1 where the user defined function calculates the similarity metric representing the similarity between the target feature and the exemplar feature.

15. The database system of claim 14 where the user defined function performs mathematical operations to determine the similarity metric.

16. The database system of claim 14 where the user defined function, in calculating the similarity metric, determines the relationships between nodes representing the target feature and the exemplar feature in a hierarchical structure.

17. The database system of claim 14 where the user defined function determines the overall match factor by computing similarity metrics by comparing each target feature in the target case with the corresponding exemplar feature in an exemplar case; and summing the similarity metrics.

18. The database system of claim 14 where the user defined function creates a weighted similarity metric by multiplying the similarity metrics by a weight associated with that similarity metric; and the user defined function determines the overall match factor by summing the weighted similarity metrics.

19. The database system of claim 1 where the user defined function indirectly recognizes the similarity between the target and exemplar case.

20. The database system of claim 1 where the user defined function is aware of features which are indicative of a finding; and the user defined function will recognize that the target case possesses the feature indicative of the finding exemplified by the exemplar case, even when the exemplar case lacks that feature.

21. The database system of claim 1 where the user defined function is aware of features, the lack of which are indicative of a finding; and the user defined function will recognize that the target case lacks a feature, the lack of which is indicative of the finding exemplified by the exemplar case, even when the exemplar case possesses that feature.

22. A computer-implemented method for use in implementing a case-based reasoning database function, where the method includes:

accepting a target case including one or more target features for comparison with a plurality of exemplar cases including one or more exemplar features stored in the database, where the target case comprises an actual problem and the exemplar cases each comprise a known problem and a corresponding solution;

comparing, within the database using a user defined function, the target features of the target case with the exemplar features of each of the plurality of exemplar cases producing similarity metrics; and generating an overall match factor based on the similarity metrics for each of the plurality of exemplar cases.

23. A computer-implemented method for implementing a case-based reasoning system within a database, the method including:

accepting information representing a target case, where the target case comprises an actual problem;

accepting weights to apply to a set of respective similarity metrics;

accepting the number of closest matching exemplar cases the user wants to review, where the exemplar cases each comprise a known problem and a corresponding solution;

formulating and executing, within the database, a comparison between the target case and the exemplar cases yielding the similarity metrics for that exemplar case;

deriving an overall match factor for each of the exemplar cases from the similarity metrics, weighed by their weights; and reporting one or more of the closest matching exemplar cases.

24. A computer-implemented database system for accessing a database, the database system including:

a massively parallel processing system including one or more nodes;

a plurality of CPUs, each of the one or more nodes providing access to one or more CPUs;

a plurality of virtual processes each of the one or more CPUs providing access to one or more processes;

each process configured to manage data stored in one of a plurality of data-storage facilities;

a case-based reasoning system including:

an exemplar object within the database configured to accept and store a plurality of exemplar cases each including one or more exemplar features, such that the exemplar cases are distributed evenly among the data storage facilities and where the exemplar cases each comprise a known problem and a corresponding solution;

a target object within the database configured to accept and store a target case including one or more target features, where the target case comprises an actual problem; and a comparison object within the database configured to use a user defined function for comparing the target features of the target case with the exemplar features of each of the plurality of exemplar cases producing similarity metrics and generating an overall match factor for each of the plurality of exemplar cases based on the similarity metrics.

* * * * *